April 8, 1969 L. L. MASON 3,437,487
APPARATUS FOR AND METHOD OF RECLAIMING BEDDING MATERIAL
Filed Sept. 2, 1964
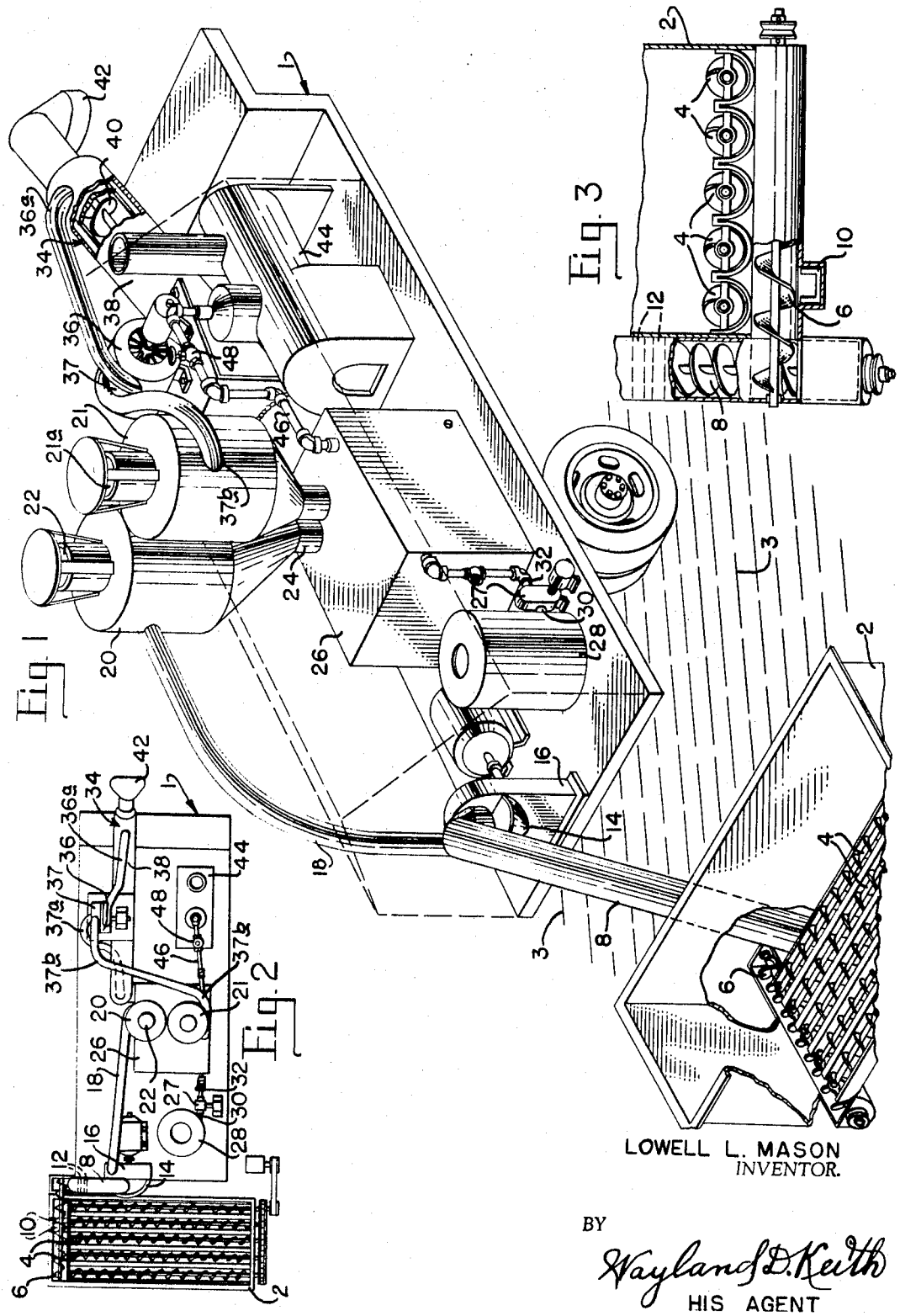
LOWELL L. MASON
INVENTOR.
BY
Wayland D. Keith
HIS AGENT

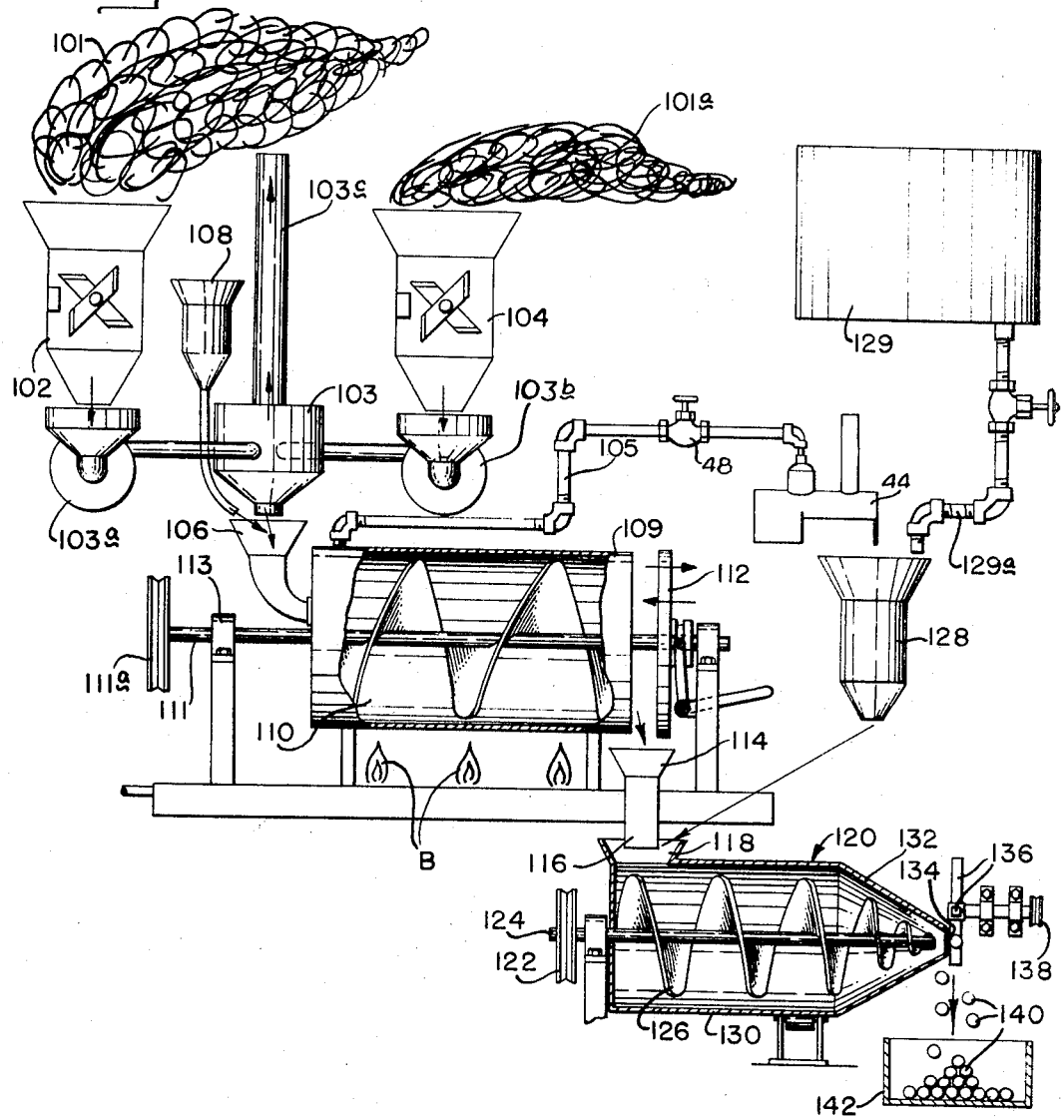

United States Patent Office 3,437,487
Patented Apr. 8, 1969

3,437,487
APPARATUS FOR AND METHOD OF RECLAIMING
BEDDING MATERIAL
Lowell L. Mason, Carlsbad, N. Mex.
(Box 5003, Security, Colo. 80911)
Filed Sept. 2, 1964, Ser. No. 393,868
Int. Cl. A23k 1/00; A01f 29/00
U.S. Cl. 99—2
15 Claims

ABSTRACT OF THE DISCLOSURE

A method of and apparatus for converting bedding material, and the like, into usable feed constituents by conveying seed material, into a hammer mill, beating it into a homogeneous mass and blowing this material through a cyclone blower, with the heavy constituents dropping into a pelleting machine, and with the noxious gases created by urine salts and fecal matter being vented therefrom.

This invention relates to reclaiming bedding material such as used in stalls, stables, and areas where animals are kept, which are usually in close proximity to race tracks and the like. This material usually consists of straw, grass, hay, and other edible vegetable roughage.

The bedding material is used only so long as it is relatively clean and sanitary, however, when the animals contaminate the bedding material by natural excretion of fecal matter and urine salts, the bedding material has heretofore been discarded or used for fertilizer.

The present process enables the bedding material containing manure and urine to be processed to enable this material to be fed to animals as roughage, as the processing of the material renders it relatively free of nitrogen type poison, residual urine toxic salts, and parasites.

Various methods have been proposed heretofore for treating fecal matter, such as in sewage, to enable the sewage to be used in the feeding of animals such as swine and the like, however, extensive equipment was necessary to process such material and if the material should contain organic or inorganic poisons which could not be treated out, or minimized to low toxicity, it was very dangerous for feeding to animals.

The present treatment of the material is such that it renders the material relatively inert or negative in poisons or toxicity, according to laboratory tests, and enables the material to be used effectively as feeding material, which normally has been heretofore wasted.

While various steps may be utilized in arriving at the finished product, drawings of two forms of the invention and the steps for processing have been illustrated herein to bring out the steps of processing material from the discarded bedding material until the finished product, ready to be fed, is had.

An object of this invention is to provide a process for rendering bedding material, containing fecal matter, sufficiently inert and free of toxicity and nitrogen poisons as to be usable as feed for animals.

Another object of the invention is to provide a process for neutralizing, to a satisfactory degree, the harmful fecal material and parasites in bedding material.

Still another object of the invention is to process bedding material in such manner as to condition it with chemicals, to render it into a feeding material that is uniformly free of parasites or disease transmitting germs.

Still another object of the invention is to disintegrate bedding material containing fecal matter, urine salts and nitrogen poisons into a homogeneous mass and admix such material with feed that is free of fecal matter to such extent that the end product contains such low percent of fecal matter, toxic salts, and nitrogen poisoning as to be of acceptable feeding quality, which will have no deleterious effect on the animals feeding on such material.

Still another object of the invention is to provide a method of making a feeding product out of a bedding material or a mixture of virgin feed and bedding material which, when mixed together, may be dehydrated and compressed into pellets, granules, or the like, either for feeding in pellet form or to be mixed with other feed.

Still another object of the invention is to provide a product made by a process whereby bedding material is aerated to remove certain moisture and odor therefrom, of disintegrating the material into a fibrous mixture so that the fecal matter and urine salts will be evenly distributed therein, and mixing certain chemicals and other feed therewith, and dehydrating the mixture and compressing the dehydrated mixture into pellet-like feed.

A further object of the invention is to provide a process for making a feed which lends to the use of portable equipment which may be moved from place to place, whereby bedding material may be processed, and the equipment moved to another location with a minimum of cost.

Yet another object of the invention is to provide a process for reclaiming bedding material, which is comparatively simple and inexpensive to carry out and which will enable contaminated bedding material to be treated to enable consumption thereof by animals.

With these objects in view and others which will become manifest as the description proceeds, reference is to be had to the accompanying drawings in which like reference characters designate like parts in the several views thereof, in which:

FIG. 1 is a perspective, side elevational view of an apparatus, mounted on a vehicle, with which to process bedding material and the like to make feed therefrom and to form it into pellets for feeding livestock;

FIG. 2 is a diagrammatic top plan view of the device, on a reduced scale, as shown in FIG. 1;

FIG. 3 is a fragmentary end elevational view of the device, with parts broken away and with parts shown in section, as shown in FIGS. 1 and 2; and FIG. 4 is a diagrammatic elevational view of a modified form of the invention which is of such construction that it may be mounted on skids or a vehicle.

With more detailed reference to FIGS. 1, 2 and 3 of the drawings, the numeral 1 designates generally a wheeled vehicle for movement over the terrain, which may be a trailer or the like. The reclaiming device has a metal-lined container 2 which may be positioned within a pit below the level of the ground 3, so that bedding material or bedding material and virgin feed may be dumped into the container 2, in which a series of augers 4 are mounted to move the bedding material and/or bedding material and feed towards an end thereof to discharge into an auger unit 6, which will move the bedding material, or bedding material and other feed mixed therewith toward an elevating auger conveyor 8, to discharge this material into the elevating auger 8. It is preferable to have magnets 10 associated with the auger unit 6 so as to remove magnetically attractable particles from the material which is passed along by the auger 4. Further magnets 12 may be associated with the housing of elevating auger 8 to remove any further magnetically attractable particles therefrom.

The elevating auger 8 elevates the material upward and discharges the material into a hopper 14 on grinder 16, which grinder is of the hammer mill or beater type to crush or disintegrate the bedding material, fecal matter and the like into a fine, homogeneous mass which is discharged from the grinder by a blower built therein into an aerial discharge pipe 18, which material is directed into a grinder cyclone cleaner 20 which permits dust, odors, and residual toxic urine salts, from the material, to be discharged out through vent 22, with the heavy portions of the feed being discharged through a neck 24 into a pelleting unit 26, which pelleting unit is of conventional commercial design.

A molasses storage tank 28 is provided, which storage tank utilizes a pump 27 to withdraw the molasses from the tank 28 by suction pipe 30 and to discharge the molasses from the pipe 32 into the pelleting machine 26. Furthermore, other additives such as antibiotics, Aureomycin as an example, salt or other minerals may be added to the molasses in tank 28 to be directed into the pelleting machine 26 so as to be ingredients of the pellets which are discharged from the pelleting machine into pellet cooler 34. The pellets are cooled by the air from a fan 36, which fan directs air through pipe 36a into the jacket 38 of pellet cooler 34. The jacket 38 is in communication with the pelleting machine 26 and the air is discharged from the jacket 38 into the pelleting machine 26. A fan 37 withdraws air from pelleting machine 26 through a pipe 37a and discharges the air and "fines" through pipe 37b tangentially into "fines" return cyclone cleaner 21 where the solids are removed and discharged into the pelleting machine 26 and the air and contaminated gases are vented out through vent 21a. A conventional conveyor auger 40 within the pellet cooler 34 is rotated at a slow rate of speed to move the pellets discharged from the pelleting machine 26 upwardly through pellet cooler 34. The conventional auger type conveyor 40 is of the same type conveyor as the elevating auger conveyor 8, as shown in FIG. 3. The pellets are thoroughly cooled and dehydrated when discharged from the pelleting machine 26 out through discharge opening 42, by conveyor auger 40. Cyclones 20 and 21 remove the odor from the fecal matter and urine salts, as well as much of the nitrogen poisoning therein is removed from the material before the material passes into the pelleting unit.

A suitable trailer or sacks may be utilized at the discharge end 42 of the pellet cooler 34 to receive the pellets therein. An air lock is provided in the discharge end of the pellet cooler so as to normalize the air pressure and permit the pellets to readily discharge.

A steam boiler 44 is mounted on vehicle 1, whereby steam is directed into the pelleting machine through pipe 46 to aid in sterilization and softening of the material to aid in pelleting. The amount of steam is regulated by a control valve 48.

It is to be understood that the various mechanisms which have moving parts therein are driven by electric motors which are suitably connected thereto in a manner well known in the art of power transmission.

SECOND FORM OF INVENTION

With more detailed reference to the drawing, the numeral 101 designates generally bedding material to be reclaimed, which, when removed from stalls, pens, and the like, is dumped in windrows to permit the material to aerate and to evaporate therefrom much of the natural moistures present from urine and fecal matter. In some seasons rain falling on the bedding material in the windrows will serve to dilute the concentration of residual urine, nitrogen poisons and to dissolve the fecal matter to a certain extent. However, when the material has leached a sufficient length of time in the weather, it is directed into a hammer mill type beater 102 or other type of disintegrator so as to shred, chop, or pulverize the bedding material and the fecal matter contained therein into a mass of relatively dry pulp-like material. As the material passes through the hammer mill or beater-like device 102, it is preferable to direct a proportionate amount of clean feed 101a such as hay, legumes or the like into a similar hammer mill or shredder 104 so that the material will be discharged from the hammer mills or disintegrators 102 and 104 simultaneously into blower fans 103a and 103b that direct the feed into a cyclone cleaner 103 with the contaminated gases being vented up through pipe 103c and the disintegrated feed being directed into hopper 106. It is preferable, at this point, to direct salt or other mineral from a dispenser 108 into hopper 106. The hopper 106 directs material into a cylindrical dryer or dehydrater 109, which preferably has mixing blades 110 therein mounted on a shaft 111, which shaft is journaled on bearings 113 to enable the shaft to be driven by a pulley 111a by a source of power (not shown) to move the material progressively from the inlet end of the dehydrater to a discharge end thereof and toward a movable closure plate 112, which plate 112 serves as a valve to retain the material within the dehydrater 109 the desired length of time to enable the moisture content to be reduced to the desired level of about ten percent. A burner B is mounted beneath a dehydrater or receptacle 109 to evaporate moisture therefrom. A steam pipe 105 may be connected to the dehydrater 109 and to boiler 44 to soften the material.

The dehydrater 109 may be of sufficient length that the closure plate 112 may be opened a predetermined amount so as to continually discharge dehydrated material therefrom into a hopper 114 which directs the material through a chute 116 into the hopper 118 of a pellet forming machine, designated generally by the numeral 120. The pellet forming machine is driven by such means as a motor and belt driving to a pulley 122 mounted on shaft 124.

As the material is being directed into the hopper 118 from chute 116, a dispenser 128 directs a parasite inhibiting material, such as antibiotics, into hopper 118 so that the material discharged from dehydrator 109 will have a proportionate amount of this material, such as Aureomycin or the like, directed uniformly thereinto. A tank 129 may contain molasses, which molasses is directed into hopper 128 by pipe 129a.

The auger 126 is fitted complementally within a cylindrical chamber 130, one end of which converges into a frusto-conical end 132, which end has an opening 134 formed centrally thereof for discharge of the compressed feeding material that has been treated and admixed with chemicals and other feeds and molasses to render a mixture of such low toxicity that it may be readily fed to stock as roughage. As the material is extruded through an opening 134 formed in the frusto-conical end 132, a breaker device, such as a rotating spoked member 136, is rotated as by a belt driving pulley 138 so that the extruded feeding material is broken into short cylindrical lengths or pellets 140 and directed into a container 142, which may be a box, sack, or the like.

The bedding material may be admixed with clean hay or grains, such as oats, corn, barley, or the like, and directed into the hammer mill or grinder 102 so it will be thoroughly admixed with the bedding material. By the introduction of steam through pipe 105, the material may be blended into a homogeneous mass and if it is desired to heat the material further, a burner B may be utilized to heat the material the desired amount, whereupon the material is discharged into a pelleting machine, such as a pelleting machine 120, whereupon the pellets are formed and cooled in the usual manner.

The pellets may be formed in the shape of cylindrical extruded pellets, cubes, wafers, blocks, or the like.

The finished feed made from the bedding material alone or made with bedding material mixed with grains or other feeding material may be treated with various minerals, salts, or medical elements to kill the parasites and the eggs thereof in the material, thereby preventing transmission of a disease from the first host to the second host. Contamination may come either from the fecal matter of the first host or from parasites such as ticks that might be present in the first host or contaminated hair that might fall from the first host and be consumed by the second host to transmit such diseases as anthrax and the like. Therefore, the aeration, dehydration, heat and chemicals are used to make the resulting feed safe and palatable for the animals.

Furthermore, nutrients such as vitamins or other feed supplements may be added as needed to supplement the nutritional quality of the feed so as to bring the nutritional value thereof up to or above the standard of feeds of this character.

Having thus clearly shown and described the invention, what is claimed as new and is desired to be secured by Letters Patent is:

1. A process of reclaiming bedding material such as hay and the like, containing fecal matter, urine salts and the like for subsequent use as an animal feed, comprising the steps:
    (a) of discharging the material to be reclaimed onto a conveying system,
    (b) of grinding the material into a palpable mass,
    (c) of directing the ground palpable mass into a centrifugal cleaner under air pressure,
    (d) of removing odoriferous gases from the mass of palpable material,
    (e) of directing the palpable material to a pelletizing operation,
    (f) of admixing a binder and a neutralizer with the palpable mass being formed into pellets,
    (g) of discharging the pellets into a cooler,
    (h) of directing cooled air in heat exchange relation with the pellet cooler, and
    (i) of directing air into the centrifugal separator for removing fines from the separator.

2. A process of reclaiming bedding material such as hay and the like, containing fecal matter, urine salts and the like for subsequent use as an animal feed, comprising the steps:
    (a) of discharging the material to be reclaimed onto a conveying system,
    (b) of grinding the material into a palpable mass,
    (c) of directing the ground palpable mass into a centrifugal cleaner under air pressure,
    (d) of removing odoriferous gases from the mass of palpable material, and
    (e) of directing the palpable material onto a conveyor for discharge therefrom.

3. A process of reclaiming bedding material such as hay and the like, containing fecal matter, urine salts and the like for subsequent use as an animal feed, as defined in claim 1, comprising the steps:
    (a) of directing a germicide into said material to be reclaimed, intermediate the grinding and discharge of the material, from a conveyor.

4. A process of reclaiming bedding material such as hay and the like, containing fecal matter, urine salts and the like for subsequent use as an animal feed, as defined in claim 1, wherein:
    (a) steam is introduced intermediate the grinding operation and the discharge operation.

5. A process of reclaiming bedding material such as hay and the like, containing fecal matter, urine salts and the like for subsequent use as an animal feed, as defined in claim 1, wherein:
    (a) said binder admixed with the palpable mass is sorghum molasses.

6. A process of reclaiming bedding material such as hay and the like, containing fecal matter, urine salts and the like for subsequent use as an animal feed, as defined in claim 1, wherein:
    (a) an antibiotic is admixed with said palpable mass intermediate the grinding thereof and the discharge of the pellets.

7. A process of manufacture of feed material for subsequent use as an animal feed, comprising the steps of:
    (a) introducing a portion of contaminated bedding material into a grinding operation,
    (b) simultaneously admixing a proportionate amount of clean feed material therewith,
    (c) directing the mass composed of ground bedding material and ground feed into a centrifuge under air pressure,
    (d) venting gases from said mixture to atmosphere to remove odors and toxic residual salts,
    (e) directing the mass of ground material into a heated chamber,
    (f) conveying the material through said heated chamber to dehydrate the material,
    (g) directing a material containing a treatment chemical into the processed material to render the material free of parasites or disease transmitting germs, and
    (h) directing the material into a container.

8. A process of manufacture of feed material for subsequent use as an animal feed, as defined in claim 7; wherein
    (a) the mass of material is directed from the heated chamber into a pelleting machine,
    (b) molasses are directed simultaneously into the pelleting machine to render the pellets more palatable and nutritious, and
        (1) which pellets are discharged from the pelleting machine.

9. An apparatus for reclaiming bedding material to make a usable animal feed, which apparatus comprises;
    (a) a receptacle for receiving bedding material,
    (b) a grinder, which grinder is in communication with said receptacle for receiving bedding material,
        (1) conveyor means connecting said grinder and said receptacle,
    (c) a centrifuge separator,
        (1) a vent pipe extending upwardly from said centrifuge separator to vent odors and toxic residual salts therefrom,
    (d) outlet conduit means connecting said grinder and the inlet of said centrifuge separator in communication to direct ground bedding material from said grinder into said separator under fluid pressure,
    (e) a storage tank adapted to contain a supply of treating material,
    (f) a treating receptacle,
        (1) a discharge outlet connected to the lower side of said centrifuge separator and with said treating receptacle to direct ground bedding material from the centrifuge separator into said treating receptacle,
        (2) a conduit leading from said storage tank to said treating receptacle to direct treating material from said storage tank into said treating receptacle, and
    (g) control means associated with said treating receptacle to regulate the discharge of ground, treated bedding material therefrom.

10. An apparatus for reclaiming bedding material into usable animal feed, as defined in claim 9; wherein
    (a) a pelleting machine in communication with said treating receptacle,
    (b) said material from said treating receptacle being discharged into said pelleting machine, and
    (c) drive means connected to said pelleting machine to drive said machine.

11. An apparatus for reclaiming bedding material to make usable animal feed, as defined in claim 9; wherein
    (a) a pelleting machine,
        (1) an auger rotatably mounted in said pelleting machine,
        (2) said ground, treated bedding material is discharged from said treating receptacle into the pelleting machine,
        (3) breaker means associated with the discharge end of said pelleting machine to break material discharging from said machine into pellets,
(b) said auger adapted to direct said material from said pelleting machine out through a constricted opening therein so as to form a compressed, homogeneous, extruded mass, and
(c) breaker means associated with the discharge end of said machine to break said homogeneous mass into relatively short lengths.

12. An apparatus for reclaiming bedding material to make usable animal feed, as defined in claim 11; wherein
(a) a molasses reservoir,
(b) conduit means to direct molasses from said reservoir into said treating receptacle simultaneously with said ground, treated, bedding material being introduced thereinto, and
   (1) an auger rotatably mounted in said treating receptacle to agitate the material therein.

13. A portable apparatus for treating bedding material to make usable animal feed, which apparatus comprises;
(a) a wheeled frame,
(b) a receptacle for receiving bedding material which receptacle is associated with said wheeled frame,
(c) a grinder mounted on said wheeled frame,
(d) a conveyor interposed between said receptacle and said grinder to convey bedding material from said receptacle into said grinder,
(e) power means connected with said grinder for rotation thereof,
(f) a centrifuge mounted on said wheeled frame,
   (1) a conduit extending from said grinder to said centrifuge to conduct ground bedding material thereinto tangentially thereof to remove solid therefrom,
   (2) a vent pipe extending upward from said centrifuge to vent odors and toxic residual salts therefrom,
   (3) said centrifuge having a discharge outlet formed in the bottom thereof to discharge the solids therefrom,
(g) a treating receptacle mounted on said wheeled frame below said centrifuge to receive the solids from said centrifuge,
(h) an additive tank mounted on said wheeled frame,
(i) conduit means connecting said additive tank and said treating receptacle in fluid communication so as to simultaneously introduce ground bedding material from the discharge opening of said centrifuge and an additive from said additive tank into said treating receptacle,
(j) said treating receptacle having a discharge opening formed therein, and
(k) conveyor means in communication with said discharge opening to direct treated, ground material from said treating receptacle outward therefrom.

14. A portable apparatus for treating bedding material to make usable animal feed, as defined in claim 13; wherein
(a) a source of steam,
   (1) a conduit connected with said source of steam and with said treating receptacle to introduce steam into said treating receptacle simultaneously, with said treated, ground bedding material from said centrifuge to sterilize the material.

15. A portable apparatus for treating bedding material to make usable animal feed, as defined in claim 13; wherein
(a) said conveyor is a screw conveyor to elevate the treated material,
(b) a jacket surrounding said conveyor, to form an air passage, and
(c) blower means connected with the passage within said jacket surrounding said conveyor for directing air at a different temperature through the passage while treated bedding material is being moved through by said conveyor.

References Cited

UNITED STATES PATENTS

| | | | |
|---|---|---|---|
| 2,651,269 | 9/1953 | French | 107—4 |
| 2,772,642 | 12/1956 | Lindl | 107—4 |
| 2,942,976 | 6/1960 | Kosch | 99—2 |
| 3,181,482 | 5/1965 | Heth et al. | 99—235 |

RAYMOND N. JONES, *Primary Examiner.*

J. M. HUNTER, *Assistant Examiner.*

U.S. Cl. X.R.

99—235